Dec. 1, 1964
R. S. LOGAN
3,159,670
FILTRATION OF PETROLEUM SULFONATE SLIMES
Filed June 27, 1960
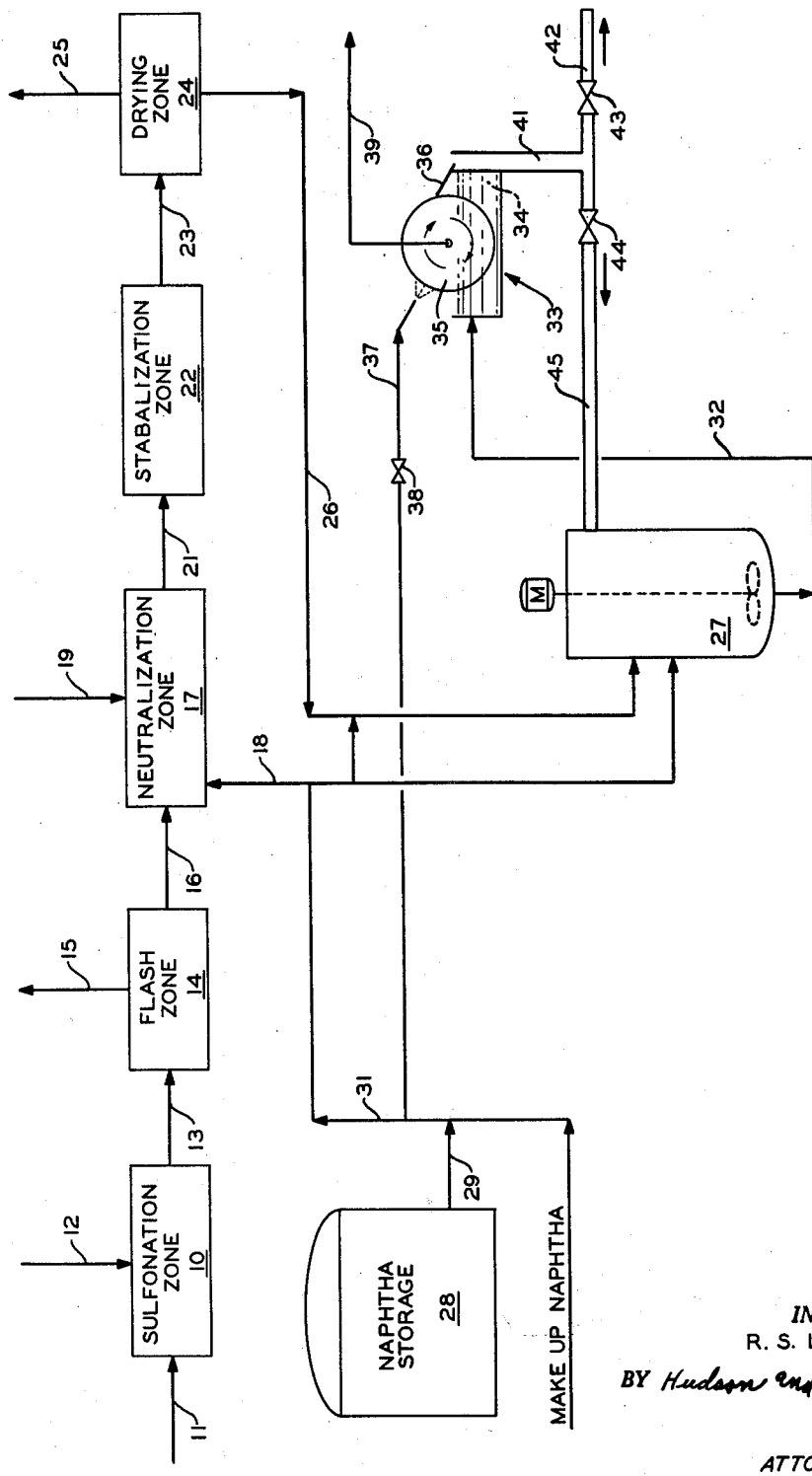
INVENTOR.
R. S. LOGAN
BY Hudson and Young
ATTORNEYS United States Patent Office  3,159,670
Patented Dec. 1, 1964

3,159,670
FILTRATION OF PETROLEUM SULFONATE SLIMES
Richard S. Logan, Bartlesville, Okla., assignor to Phillips Petroleum Company, a corporation of Delaware
Filed June 27, 1960, Ser. No. 38,901
4 Claims. (Cl. 260—504)

This invention relates to a filtration process. In one aspect it relates to the recovery of calcium petroleum sulfonates from a sulfonation reaction product containing such sulfonates. In still another aspect it relates to a method for overcoming difficulties in the filtration of calcium petroleum sulfonate containing mixtures which arise as a result of the physical properties of the reaction product containing such calcium petroleum sulfonates.

Metal petroleum sulfonates are widely used in the manufacture of lubricating oil additives and greases. Recently a process has been developed for the manufacture of superior metal petroleum sulfonates, particularly calcium petroleum sulfonates, by the sulfonation of a highly viscous, highly refined paraffinic oil fraction having a viscosity of about 200 to 230 SUS at 210° F. and having a viscosity index of about 85 to 100 or higher. In the production of these high molecular weight calcium petroleum sulfonates the oil is sulfonated with a sulfonation agent such as fuming sulfuric acid, chlorosulfonic acid, mixtures of chlorosulfonic acid and sulfur trioxide, sulfur trioxide dissolved in liquid sulfur dioxide, and other similar sulfonating agents. No separate sludge phase is produced when these high molecular weight, high viscosity oils are sulfonated and therefore the total reaction product, except for any excess sulfonating agent which can be recovered, is neutralized with an aqueous slurry of a metal hydroxide such as calcium hydroxide (such as lime) so as to convert simultaneously the sulfonic acids to the corresponding metal petroleum sulfonate and to neutralize all of the inorganic acids in the reaction product. An excess of metal hydroxide is used and it is necessary to remove metal hydroxides and other solid materials such as inorganic salts which remain in the reaction product following the neutralization step. These solids ordinarily are removed in a filtration step and the separation of the lime-neutralized sulfonation mixture, by filtration, is the primary concern of this invention.

In my copending application Serial No. 776,753, filed November 28, 1958, now U.S. Patent No. 3,023,231, I have described a method for improving the filtration step in such process by stabilizing and dehydrating the lime-neutralized sulfonation reaction product under such conditions of temperature and pressure as to prevent dehydration of calcium sulfate dihydrate so as to improve the filterability of the reaction product. In my copending application Serial No. 698,605, filed November 25, 1957, now U.S. Patent No. 3,006,952, I have disclosed the addition of a ketone having 4 to 10 carbon atoms to the metal petroleum sulfonate reaction product prior to filtration so as to improve the filterability of the reaction product and to increase the ash content of the product recovered from the filtration step. The practice of the inventions described in these two copending applications overcomes, to a great extent, the problem of filtering the slime which constitutes the reaction product of the sulfonation reaction, particularly when employed in conjunction with a continuous precoat filter. It has been found, however, that there are times when circumstances beyond the control of the operator result in clogging of the filter medium to the detriment of the filtering operation in that the filter cake becomes wet, slimy, and sticky, the filter cake hangs up on the doctor knife, wash liquid runs off of the cake into the pan and it becomes necessary to shut down the operation and to clean the doctor knife and other elements of the equipment.

By way of further explanation the problem is to remove calcium sulfate and hydrated lime from a slurry of these solid materials in an oily product. This is a very difficult filtration problem. A rotary drum continuous vacuum filter ordinarily is employed and a doctor knife is used to remove a very thin cake of solid which builds up on the filter surface of the filter drum. A solvent such as naphtha, Stoddard solvent or methyl isobutyl ketone is usually sprayed onto the surface of the filter drum to wash the filter cake prior to its removal by the doctor knife. Usually, as is the case in this invention, a thick precoat of filter aid is provided on the surface of the filter drum and a continuously adjustable doctor knife or scraper is employed which removes a very thin layer of the precoat and thus continuously provides a fresh filter surface.

The principal object of this invention is to provide a method for restoring satisfactory filtration conditions in the separation of solids from a metal petroleum sulfonate product when the filter medium becomes clogged as a result of a malfunction in the process. Another object is to restore a malfunctioning, continuous precoat filter operation to satisfactory operation while still utilizing the filter in the process. A further object of this invention is the provision of a method for improving the filtration step in the separation of inorganic solids from a metal petroleum sulfonate. Other objects and advantages of this invention will be apparent to one skilled in the art upon study of this disclosure, including the detailed description of the invention and the appended drawing wherein:

The figure is a schematic flow sheet of the sulfonation process including the filtration step.

Broadly, the invention contemplates restoration of satisfactory filtration by cessation of the solvent wash of the filter cake and recycle of the unwashed filter cake to the feed tank for a period of 1 to 5 hours, after which normal operation is resumed. Production of metal petroleum sulfonate continues throughout this recycle operation at a somewhat reduced rate.

Referring now to the drawing, a feed stock such as a solvent refined, dewaxed lubricating oil fraction derived from a Mid-Continent petroleum, having a viscosity of about 200 to 230 SUS at 210° F. and a viscosity index of 85 to 100 or higher, is introduced to sulfonation zone 10 via conduit 11. Sulfonating agent such as sulfur trioxide dissolved in sulfur dioxide is introduced to sulfonation zone 10 via conduit 12. Reaction products pass via conduit 13 to flash zone 14 where excess sulfonation agent or solvent is removed via conduit 15. The remaining reaction product passes via conduit 16 to neutralization zone 17 wherein it is diluted with a hydrocarbon solvent, such as naphtha, introduced via conduit 18 and is neutralized by a slurry of metal hydroxide, such as an aqueous slurry of lime, introduced via conduit 19. The resulting substantially neutralized slurry of calcium sulfate and calcium hydroxide in water and diluted sulfonation reaction effluent is passed via conduit 21 to stabilization zone 22 wherein the reaction product is maintained in the presence of the metal hydroxide at elevated temperature and elevated pressure so as to stabilize the same with respect to ferrous corrosion as determined by the total base number of the mixture. The total base number is a measure of the alkalinity of the neutralized mixture. This is determined by an electrometric titration with 0.1 normal hydrochloric acid to a pH of 4.0 and then conversion of the value to that of potassium hydroxide. In order to be satisfactory a value in excess of 7.8 mg. of potassium hydroxide per gram of sample should be obtained. The stabilized reaction product is then passed via conduit 23 to drying zone 24 where substantially all of the water is removed via conduit 25. The stabilized and dehydrated reaction product is then passed via conduit 26 to filter feed surge tank 27. Additional diluent such as naphtha is passed from naphtha storage 28 via conduits 29 and 31 to conduit 26 or to surge tank 27. The diluted reaction product is passed from surge tank 27 via conduit 32 to filter indicated as 33. Filter 33 is a continuous precoat rotary filter comprising pickup vessel 34, rotary drum 35 and knife 36. The filter surface emerging from the pickup vessel is washed with a spray of solvent introduced via conduit 37 containing valve 38. Filter cake removed from the surface of filter drum 35 by knife 36 passes to conduit 41 and is removed from the system via conduit 42 when valve 43 is open and valve 44 in conduit 45 is closed. Filtrate comprising calcium petroleum sulfonate and unsulfonated oil is recovered as product via conduit 39.

In the operation of the method of this invention, occasioned by clogging of the filter medium surface on drum 35, the valve 38 in conduit 37 is closed; valve 43 in conduit 42 is closed; valve 44 in conduit 45 is opened so that the unwashed filter cake removed by knife 36 is passed via conduits 41 and 45 to surge tank 27 and this operation is continued for 1 to 5 hours after which valve 38 in conduit 37 is again opened and if the filter cake then removed by knife 36 is satisfactorily dry and free from tack, valve 43 is opened, valve 44 is closed and normal operation is resumed.

The advantages of the invention are further set forth in the following examples; however, it is to be understood that the examples are not to be considered as unduly limiting the invention.

EXAMPLE I

A number of sulfonation and neutralization runs were made in a pilot plant wherein a 250 stock (a propane fractioned, solvent refined Mid-Continent lubricating oil blending stock having a viscosity of about 200 to 230 SUS at 210° F.) was sulfonated with liquid sulfur trioxide in liquid sulfur dioxide, and the sulfonic acids then neutralized with a lime slurry. The sulfonating and neutralizing conditions for these runs are set forth in Table I.

*Table I*

| Run No. | Acid Feed, Wt. Percent $SO_3$ | $SO_3$/Oil Wt. Ratio | Sulfonation Conditions | | | Lime Slurry Composition[1] | | |
|---|---|---|---|---|---|---|---|---|
| | | | Temp., °F. | Time, Min. | Press., p.s.i.g. | Water, Wt. Percent | Lime, Wt. Percent | Excess Lime, Wt. Percent |
| 1 | 10 | 0.091 | 92 | 13 | 110 | 81 | 19 | 52.5 |
| 2 | 10 | 0.080 | 110 | 13 | 110 | 83.2 | 16.8 | 69.5 |
| 3 | 10 | .080 | 110 | 10 | 130 | 83 | 17 | 70 |

[1] Although no solvent is added to the lime slurry, Stoddard solvent is added to the acid mixture before it goes to the lime slurry. In the finished neutral mixtures there is approximately 0.43 pound of solvent per pound of water.

Samples of each of the lime-neutralized sulfonation mixtures prepared in the above described pilot plant runs were then treated in the following manner. The lime-neutralized samples were heated in a closed vessel, under sufficient pressure to maintain the liquid phase, so as to stabilize the same with respect to ferrous corrosion (as determined by the total base number), then certain of these samples were dehydrated and filtered in the laboratory. Conditions of treatment and filtration results are set forth in Table II.

*Table II*

| Run No. | Stabilizing Treating Conditions | | Temp. of Stabilized Sample before Reducing Press., °F. | Dehydrating Conditions | | | Filtration Time to Collect 40 ml. Filtrate | |
|---|---|---|---|---|---|---|---|---|
| | Residence, Min. | Temp., °F. | | Temp., °F. | Vacuum, in. Hg | Residence, Min. | Before Recycle, Min. | After Recycle,[2] Min. |
| 1 | 12 | 366 | 366 | Sample not dehydrated [1] | | | >16 | 5 |
| 2 | 12 | 366 | 366 | 180 | 28 | 40 | >15 | 5 |
| 3 | 14 | 360 | 250 | 250 | 0 | 5 | >15 | 5 |

[1] Stabilizing treating conditions reducing water content of sample to 0.4% and further dehydration was not necessary.
[2] Since in each of the three examples given above the filtration is unsatisfactory, wash solvent is shut off and the unwashed filter cake is recycled for a period of four hours. Good filtration is thereby obtained.

EXAMPLE II

Additional samples were prepared according to the sulfonation, stabilization and dehydration conditions set forth above for Run No. 3. The filter feed contains approximately 2 parts of solvent [a] per 1 part of oil by volume. The filtration results which were obtained by adding filter cake to the feed are presented in Table III. For this run, the indicated amount of filter cake was obtained from the material which was removed by the knife scraper; this wet cake consisted of 60% solids of which half, or 30%, is filter aid.

Table III

| Run No. | Feed to Filter | | Filtration Time in Min. | | Calc. Wt. Percent Filter Aid in Feed [1] |
|---|---|---|---|---|---|
| | Straight Feed, gm. | Filter Cake,[1] gm. | To 1st Drop | To 40 ml. | |
| 4 | 310 | 0 | >66 | ---- | 0 |
| 5 | 310 | 80 | 27.6 | 45.2 | 6.2 |
| 6 | 310 | 120 | 9.8 | 35.5 | 8.4 |

[1] The filter cake added is 30% filter aid, as explained above.

The results given above in terms of filter cake concentration can be readily converted to recycle time as described in the invention, when the capacity of the filter feed system and the filtration conditions are known.

That which is claimed is:

1. The method of restoring normal filtration separation of solids from a metal petroleum sulfonate contained in the product of sulfonation of a viscous refined petroleum fraction having a viscosity of about 200 to 230 SUS at 210° F. and having a viscosity index of at least about 85 wherein the filter medium of the filter being utilized becomes clogged as a result of a malfunction in the process which method comprises returning all of the filter cake removed from the filter to the sole feed to the filter until normal filtration is obtained.

2. The method of claim 1 wherein a solvent wash is introduced to the filter cake during normal filtration conditions and is terminated during the period that the filter cake is being returned to the feed to the filter.

3. In the preparation of metal petroleum sulfonates wherein a viscous, refined petroleum fraction having a viscosity of about 200 to 230 SUS at 210° F. and having a viscosity index of at least about 85 is sulfonated with a sulfonation agent, the resulting sulfonic acids are neutralized with a metal hydroxide, the mixture is passed to a surge vessel, then to a filter where it is filtered on a continuous filter utilizing a filter aid and a solvent wash of the filter cake to facilitate passing the oily materials through the filter medium and the filter cake is removed and discarded, and wherein the filter medium becomes clogged from time to time with the mixture being filtered, the improvement comprising the steps of stopping the flow of solvent wash to the filter cake; passing all of the filter cake removed from the filter to the surge vessel until the filter medium is no longer clogged; and then resuming the step of washing the filter cake with solvent and the step of discarding the filter cake removed from the filter.

4. In the filtration of neutralized product of sulfonation of a viscous, refined petroleum fraction having a viscosity of about 200 to 230 SUS at 210° F. and having a viscosity index of at least about 85 wherein said product is fed to a continuous precoat filter, the filter cake is washed with a solvent on the filter and is discarded when removed from the filter, the improvement comprising restoring normal filtration operation when the filter medium becomes clogged by stopping the flow of wash solvent to the filter cake; and passing all of the filter cake removed from the filter to the sole feed to the filter for a period of about 1–5 hours; and then resuming the solvent flow and resuming the discarding of the filter cake.

[a] Stoddard "Special" with an ASTM boiling point range of 318–335° F.

References Cited in the file of this patent

UNITED STATES PATENTS

| 2,306,074 | Meyer | Dec. 22, 1942 |
| 2,444,466 | Peterson | July 6, 1948 |
| 2,562,699 | Cooperson et al. | July 31, 1951 |
| 2,573,796 | Latier et al. | Nov. 6, 1951 |
| 2,588,976 | Fuhrmeister | Mar. 11, 1952 |
| 2,738,326 | Anderson et al. | Mar. 13, 1956 |
| 2,839,194 | Lopker et al. | June 17, 1958 |
| 2,843,626 | Gebelein | July 15, 1958 |
| 2,909,563 | Whitney | Oct. 20, 1959 |
| 2,960,233 | Schepman | Nov. 15, 1960 |
| 3,006,952 | Logan | Oct. 31, 1961 |
| 3,023,231 | Logan | Feb. 27, 1962 |

FOREIGN PATENTS

| 154,099 | Australia | Nov. 11, 1953 |